US008650599B2

(12) United States Patent
Shindo et al.

(10) Patent No.: US 8,650,599 B2
(45) Date of Patent: Feb. 11, 2014

(54) ACCUMULATION DISPLAY DEVICE, INTERLOCKED DISPLAY METHOD AND SYSTEM

(75) Inventors: Isao Shindo, Tokyo (JP); Yasuo Endo, Chiba-ken (JP); Yutaka Tomioka, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 1193 days.

(21) Appl. No.: 10/594,774

(22) PCT Filed: Mar. 29, 2005

(86) PCT No.: PCT/JP2005/005879
§ 371 (c)(1),
(2), (4) Date: Sep. 29, 2006

(87) PCT Pub. No.: WO2005/094080
PCT Pub. Date: Oct. 6, 2005

(65) Prior Publication Data
US 2008/0094310 A1    Apr. 24, 2008

(30) Foreign Application Priority Data

Mar. 29, 2004  (JP) ................................. 2004-096864

(51) Int. Cl.
*H04N 7/173* (2011.01)
*H04N 7/16* (2011.01)
*H04N 7/18* (2006.01)
*G09G 5/00* (2006.01)

(52) U.S. Cl.
USPC .................. 725/80; 725/62; 725/81; 725/87; 725/88; 725/93; 725/102; 725/123; 725/153; 345/1.1; 345/2.1; 345/2.2; 345/2.3

(58) Field of Classification Search
None
See application file for complete search history.

(56) References Cited

U.S. PATENT DOCUMENTS 6,360,218 B1 *  3/2002  Zander et al. .......................... 1/1
6,678,332 B1 *  1/2004  Gardere et al. .......... 375/240.26
(Continued)

FOREIGN PATENT DOCUMENTS

| EP | 1246070 A1 | 10/2002 |
| EP | 1286516 A2 | 2/2003 |
| JP | 11-196345 | 7/1999 |
| JP | 2002-247472 | 8/2002 |

(Continued)

OTHER PUBLICATIONS

International Search Report for Application No. PCT/JP2005/005879 dated Aug. 2, 2005.

(Continued)

*Primary Examiner* — Nasser Goodarzi
*Assistant Examiner* — Mary A Kay
(74) *Attorney, Agent, or Firm* — RatnerPrestia

(57) ABSTRACT

An accumulation display device can interlock a display content according to specification of each of the mobile data terminals. An interlocked display system includes an accumulation display device having a metadata interpretation unit that analyzes metadata transmitted by a broadcast wave or a communication network and an accumulated image processing unit that performs accumulation processing of a program content or transmission processing of a restructured program content and managing each mobile data terminal, and the mobile data terminal. Highlights or replays of various scenes of a program currently viewed on the accumulation display device can be viewed on another device. Information on the currently viewed program and a related program as well as a previous scene can be viewed on the mobile data terminal.

13 Claims, 23 Drawing Sheets

(56) References Cited

U.S. PATENT DOCUMENTS

| | | | |
|---|---|---|---|
| 7,134,074 B2 * | 11/2006 | Munetsugu et al. | 715/204 |
| 7,272,843 B1 * | 9/2007 | Nejime et al. | 725/32 |
| 7,302,224 B2 * | 11/2007 | Sibley et al. | 455/3.02 |
| 7,634,795 B2 * | 12/2009 | Dureau | 725/80 |
| 2002/0108109 A1 | 8/2002 | Harris et al. | |
| 2002/0144007 A1 * | 10/2002 | Shteyn | 709/313 |
| 2002/0166123 A1 * | 11/2002 | Schrader et al. | 725/58 |
| 2003/0154217 A1 * | 8/2003 | Kinno et al. | 707/104.1 |
| 2003/0161610 A1 | 8/2003 | Miyazawa et al. | |
| 2004/0055018 A1 | 3/2004 | Stone | |
| 2004/0249861 A1 * | 12/2004 | Hoshino et al. | 707/104.1 |
| 2006/0041915 A1 * | 2/2006 | Dimitrova et al. | 725/81 |

FOREIGN PATENT DOCUMENTS

| | | |
|---|---|---|
| JP | 2003-163847 | 6/2003 |
| JP | 2003-196491 | 7/2003 |
| JP | 2003-259316 | 9/2003 |
| JP | 2003-304523 | 10/2003 |
| JP | 2003-319366 | 11/2003 |
| JP | 2004-173120 | 6/2004 |
| WO | WO 03/019944 A1 | 3/2003 |

OTHER PUBLICATIONS

Supplementary European Search Report for Application No. EP 05 72 7452 dated Sep. 24, 2012.

* cited by examiner

FIG. 6

```
<Content ID="200301011700FUJI">
        <Index ID="001">
                    <starttime>200301011903</starttime>
                    <finishtime>200301011907</finishtime>
        </Index>
</Content>
```

FIG. 8

```
<ContentID="20030101 1700FUJI">
  <modeInfo modeID="REPLAY">
    <Index totalnum="3">
      <No1ID="001"/>
      <No2ID="011"/>
      <No3ID="035"/>
    </Index>
    <totaltime>00:05:00</totaltime>
  </Trigger>
</Content>
```

FIG. 12

```
<ContentID="200301011700FUJI">
<modeInfo modeID="PREVIOUS HIGHLIGHT">
    <Index>
        <No1 ID="999"/>
    </Index>
    <totaltime>00:05:00</totaltime>
    <Indexgrade/>
    <RecodingInfo>
        <flag>ON</flag>
        <InfoID="ex001">"HIGHLIGHT OF THE TENTH EPISODE"
        <Time strat="200301011700" stop="200301011708"/>
    </RecodingInfo>
    </Trigger>
</Content>
```

FIG. 14

| | | |
|---|---|---|
| 20 — | TERMINAL ID | 1 |
| 21 — | OWNER | TARO MATSUSHITA |
| 22 — | CONNECTED STATUS | ON |
| 23 — | USER | TARO MATSUSHITA |
| 24 — | PERFORMANCE | DISPLAYSIZE=2.5 |
| | | RESOLUTION=345 × 456 |
| | | encode=mpeg4.wmv.asx |
| 25 — | MODE INFORMATION | REPLAY |
| | INFORMATION | REWIND — 30 |
| | | second=255 — 31 |

19

```
<Content ID="200301011700FUJI">
    <Index ID="001">
        <mean>
            <person>GIANTS-KIYOHARA</person>
            <action>HIT</action>
            <result></result>
            <number>1</number>
        </mean>
        <starttime>200301011903</starttime>
        <finishtime>200301011907</finishtime>
    </Index>
</Content>
```

FIG. 22

```
<ContentID="20030101170OFUJI">
 <modeInfo modeID="REPLAY">
  <mean>
   <person>GIANTS-KIYOHARA</person>
   <action>BATTING</action>
   <result></result>
  </mean>
  <Index totalnum="3">
   <No1 ID="001"/>
   <No2 ID="011"/>
   <No3 ID="035"/>
  </Index>
  <totaltime>00:05:00</totaltime>
  <Indexgrade>
   <grade3 element="action, result">
    <text>HOME RUN </text>
    <text>SCORE </text>
   </grade3 >
   <grade2 element="action, result">
    <text>SECOND-BASE HIT </text>
    <text>THIRD-BASE HIT </text>
    <text>STRIKEOUT </text>
    <text>DOUBLE PLAY </text>
   </grade3 >
  </Indexgrade>
 </Trigger>
</Content>
```

FIG. 24

```
<ContentID="20030101700FUJI">
  <modeInfo modeID="REPLAY">
    <Index totalnum="3">
      <No1>
        <starttime>00:05:00<starttime/>
        <duration>00:02:00<duration/>
      </No1>
      <No2>
        <starttime>00:10:00<starttime/>
        <duration>00:02:00<duration/>
      </No2>
      <No3>
        <starttime>00:15:00<starttime/>
        <duration>00:01:00<duration/>
      </No3>
    </Index>
    <totaltime>00:05:00</totaltime>
  </Trigger>
</Content>
```

FIG. 25

| 11 | PROGRAM ID | | 1 |
|---|---|---|---|
| 37 | SERVICE ID (CHANNEL) | | 1 |
| 38 | STARTTIME | | 19:00:00 |
| 39 | TIME (DURATION) | | 2:00:00 |
| 40 | TITLE | | SERIAL DRAMA "ASU E NO TABI" |
| 41 | KEYWORD | | HOPELESS |
| | | | EFFORT |
| | | | HOPE |
| 42 | PERFORMERS | DIRECTOR | TARO MATSUSHITA |
| | | SCRIPTWRITER | HANAKO MATSUSHITA |
| | | PERFORMERS | ICHIRO MATSUSHITA |
| | | | JIRO MATSUSHITA |
| 43 | CATEGORY | | DRAMA |
| | | | FICTION |
| 44 | SERIES | | THIRD EPISODE (COMPLETE IN 12 EPISODES) |
| 45 | VIEWING LIMIT | | ABSENT |
| 46 | INTERLOCKED VIEWING SERVICE (MOBILE TRANSFER SERVICE) | | PRESENT |
| 16 | MODE INFORMATION | | DIGEST OF FIRST TO THIRD EPISODES |
| | | | HIGHLIGHTS OF ICHIRO MATSUSHITA |
| | | | HIGHLIGHTS OF JIRO MATSUSHITA |
| | | | HIGHLIGHTS OF PREVIOUS EPISODE (SECOND EPISODES) |
| | | | HIGHLIGHTS OF PREVIOUS EPISODES (FIRST AND SECOND EPISODES) |

ACCUMULATION DISPLAY DEVICE, INTERLOCKED DISPLAY METHOD AND SYSTEM

This Application is a U.S. National Phase Application of PCT International Application PCT/JP2005/005879.

FIELD OF THE INVENTION

The present invention relates to an accumulation display device which accumulates and displays digital broadcast data transmitted from a broadcasting station, information provided separately from this broadcast, or previous broadcast and information provided separately therefrom. More specifically, the present invention relates to an accumulation display device, an interlocked display method, and a system, which, for display, interlock with a mobile data terminal as a sub-display device used near the accumulation display device and the user.

DESCRIPTION OF THE RELATED ART

In television broadcasting in recent years, digital broadcasting using BS and CS (broadcasting satellites) has been performed in Japan. Ground-wave digital broadcasting has been also performed since the end of 2003. The digital broadcasting can transmit a large amount of data and broadcast a large number of channels as compared with analog broadcasting. Various information in addition to video and audio information can also be broadcasted. Such various information includes a program schedule, program attribute information, and data for a personal computer. The user can view video and audio information and receive service using such various information. With the explosive spread of ADSL, the Internet contents have penetrated into homes. Viewers use the Internet as an information source and can enjoy moving images. Against such background, the border between broadcasting and the Internet has been less clear. Using broadcast attribute information, viewers can enjoy broadcasting interlocked with the Internet (see Patent Document 1).

With the widespread use of data broadcasting and a mobile data terminal, there are various ways of enjoying broadcasting and the Internet (see Patent Document 2). The user can view two pieces of related information at the same time.

The increased use of a wireless liquid crystal television has realized a viewing form using a large-screen immobile television and the wireless liquid crystal television.
Patent Document 1: JP-A No. Hei 11-196345
Patent Document 2: JP-A No. 2002-247472

In the prior art, a replay or highlight of a currently broadcasted program in real time cannot be viewed on another device.

SUMMARY OF THE INVENTION

An object of the present invention is to provide an accumulation display device as a main display device and a mobile data terminal as a sub-display device, which can display, on the mobile data terminal, a replay or highlight of a currently viewed program on the accumulation display device. An image of the highlight or replay intended by a broadcasting station is displayed at timing intended by the broadcasting station.

To solve the above problem, an accumulation display device of the present invention includes a reception unit that receives currently broadcasted program content and trigger information for special reproduction of the program content, accumulation means that accumulates the program content, a metadata interpretation unit that interprets the trigger information of the currently broadcasted or the accumulated program content and outputs mode information for special reproduction, and an accumulated image processing unit that extracts and restructures at least a part of the accumulated program content based on the mode information from the trigger information, and outputs the restructured program content.

An accumulation display device of the present invention includes a reception unit that receives a currently broadcasted program content and trigger information for special reproduction of the program content, accumulation means that accumulates the program content, a metadata interpretation unit that interprets the trigger information of the currently broadcasted or the accumulated program content and outputs mode information for special reproduction, and an accumulated image processing unit that extracts and restructures at least a part of the accumulated program content based on the mode information from the trigger information, and outputs the restructured program content. In the accumulation display device, the reception unit further receives index information of a currently broadcasted program, the accumulation means further accumulates the index information, the metadata interpretation unit further interprets the index information, the accumulated image processing unit further extracts and restructures at least a part of the program content together with the index information from the accumulation means based on the contents of the trigger information and transmits for display the program content restructured in the accumulated image processing unit to the mobile data terminal.

The accumulation display device of the present invention has a mobile data terminal management unit that manages a mobile data terminal. The metadata interpretation unit extracts index information and trigger information of a currently viewed program from metadata transmitted by a broadcast wave or a communication network. The index information associated with a program content is accumulated. The trigger information is checked with information from the mobile data terminal management unit. When the trigger information is used, the partial program content written into the trigger information is extracted based on the index information to be transmitted to the accumulated image processing unit. The accumulated image processing unit accumulates the currently viewed program content to receive the trigger information, the index information, and the partial program content transmitted by an instruction from the metadata interpretation unit. The accumulated image processing unit processes and restructures the partial content from the contents of the trigger information and the index information for transmitting it to the corresponding mobile data terminal.

In the present invention, the metadata interpretation unit extracts and processes program information included in metadata of the currently viewed program and transmits it to the mobile data terminal registered into the mobile data terminal management unit.

In the present invention, the trigger information includes accumulation instruction information of a program content related to the currently viewed program content, and index information instructed by the trigger information includes the program content related to the currently viewed program content.

In the present invention, the metadata interpretation unit receives an operation input from the mobile data terminal to instruct the accumulated image processing unit to restructure partial a program content for realizing video operation on the mobile data terminal.

In the present invention, the accumulation display device accumulates all programs like a home server regardless of viewing or accumulates a registered program from the mobile data terminal, and transmits a partial program content to the mobile data terminal based on the trigger information.

As described above, according to the present invention, the highlight or replay of a previous scene of a currently viewed program on the accumulation display device can be viewed on another device. Information on a currently viewed program or a related program as well as a previous scene can be passively viewed like TV viewing on the other device.

When the user who is not at home is not viewing a currently broadcasted program, he/she can view the notable scene or digest thereof on another device on hand in real time.

The above object and advantages of the present invention will be more apparent by the following embodiments described with reference to the accompanying drawings.

BRIEF DESCRIPTION OF THE DRAWINGS

FIG. 6 is a diagram showing a description example of index information according to Embodiment 1;

FIG. 8 is a diagram showing a description example of trigger information according to Embodiment 1;

FIG. 12 is a diagram showing a description example of trigger information according to Embodiment 3;

FIG. 14 is a diagram showing a data structure example of a mobile data terminal managed by a mobile data terminal management unit according to Embodiment 4;

FIG. 22 is a diagram showing a description example of trigger information according to Embodiment 5;

FIG. 24 is a diagram showing a description example of trigger information according to Embodiment 6; and FIG. 25 is a diagram showing an example of program information data.

DETAILED DESCRIPTION OF THE PREFERRED EMBODIMENTS

Embodiments of the present invention will be described below using FIGS. 1 to 24. The present invention is not limited to the embodiments and can be embodied in various forms in the scope without departing from its purport.

(Embodiment 1)

Figure 1:
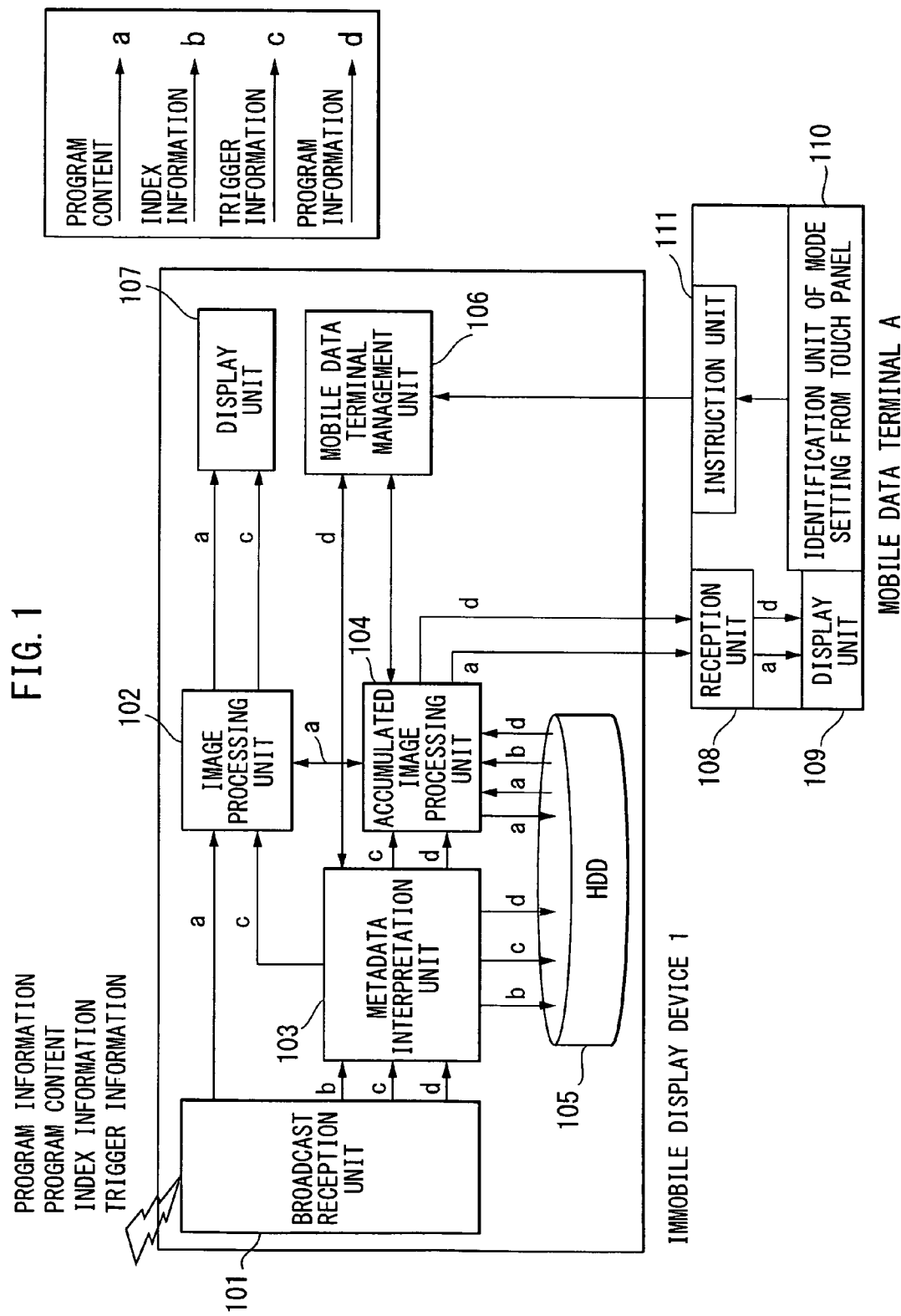
FIG. 1 is a block diagram showing the overall configuration of an interlocked display system according to Embodiment 1 of the present invention.
Figure 2:
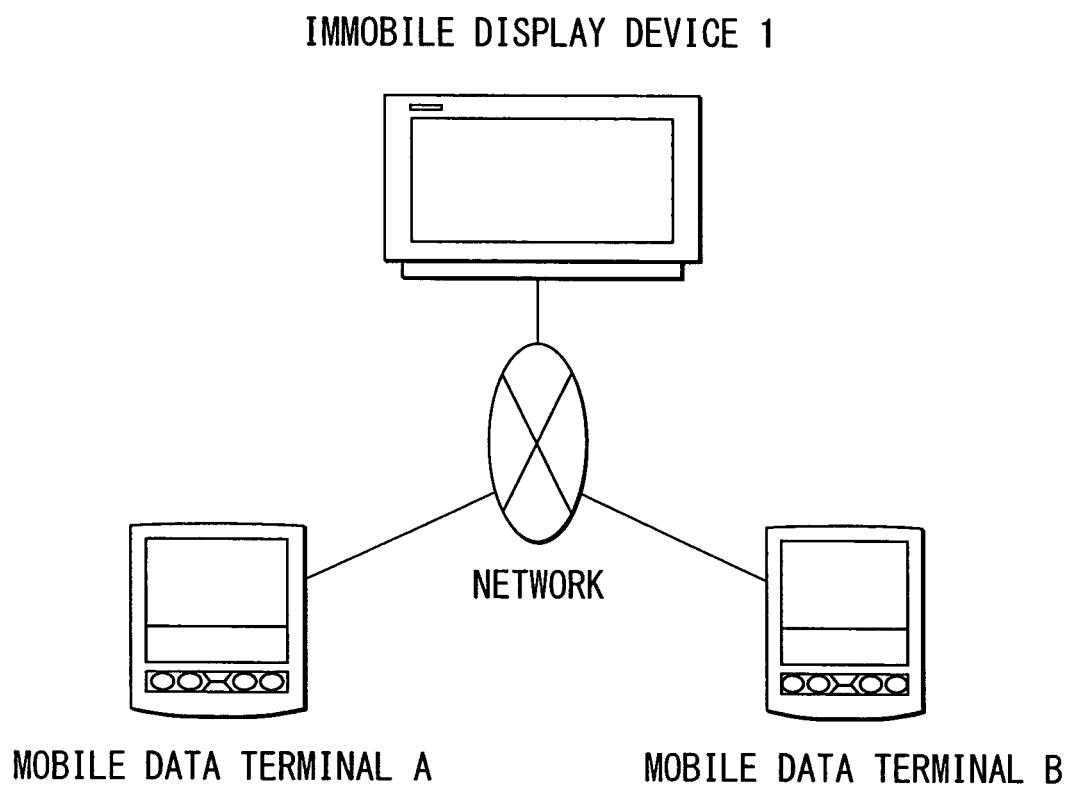
FIG. 2 is a device block diagram according to Embodiment 1.

FIG. 1 is a block diagram showing the overall configuration of an interlocked display system according to a first embodiment of the present invention. As shown in FIG. 2, the overall configuration of the interlocked display system has an accumulation display device as a main display device, and mobile data terminals A and B as sub-display devices receiving a program content from the accumulation display device. The accumulation display device which is not limited to such configuration form may be an immobile display device, a home server, an HDD accumulation device, a DVD accumulation device, a PVR, a personal computer, and an HDD TV, and may integrally have a broadcast reception function, an accumulation function, and a display function, or a combination of these. The sub-display device may be a mobile data terminal, a cellular phone, a PDA, a personal computer, or a dedicated terminal. This embodiment will be described by taking, as an example, the immobile display device having an HDD as the accumulation display device as a main display device and the mobile data terminal as the sub-display device.

In FIG. 1, the configuration of an immobile display device 1 will be described. The immobile display device 1 has a broadcast reception unit 101 receiving a program content and metadata such as index information or trigger information from a broadcast wave or a network, an image processing unit 102 signal-processing the program content received by the broadcast reception unit 101 to transmit it to a display means side and an accumulation means side, a metadata interpretation unit 103 analyzing the contents of the metadata received by the broadcast reception unit 101, an accumulated image processing unit 104 performing accumulation processing of the program content or transmission processing the restructured program content, a hard disk (HDD) 105 as accumulation means storing the program content or index information, a mobile data terminal management unit 106 managing information of a mobile data terminal to which the restructured program content is transmitted, and a display unit 107 receiving and displaying an input of the program content from the image processing unit 102. In FIG. 1, of alphabet references a, b, and c given to partial signal lines, a (seven points) denotes a signal line to which the program content is transmitted, b (two points) denotes a signal line to which the index information is transmitted, and c (three points) denotes a signal line to which the trigger information is transmitted.

The index information is information specifying a scene of a program. The index information is specified to specify a specific scene of the corresponding program.

The trigger information can specify transfer or delivery timing of a program to the mobile data terminal and specify a scene of the delivered program. The index information can be specified to specify the scene of the program.

The broadcast reception unit 101 receives a program content, index information, and trigger information from a broadcast wave or a network. The broadcast wave is assumed to be a broadcast wave of digital broadcasting or satellite broadcasting and is not limited thereto. The network is assumed to be a network referring to a communication network such as ADSL or FTTH and is not limited thereto.

The image processing unit 102 outputs and displays the program content received by the broadcast reception unit 101 to the display unit 107 and outputs a currently viewed program content to the accumulated image processing unit 104. All program contents or an arbitrary program content as well as the currently viewed program content may be accumulated on the HDD 105. The program content accumulated on the HDD 105 as well as the currently broadcasted program content can be adapted to viewing.

An accumulation instruction from the user or a viewing instruction on the mobile data terminal may be received to accumulate the corresponding program content regardless of the presence or absence of viewing on the immobile display device 1.

Figure 5:
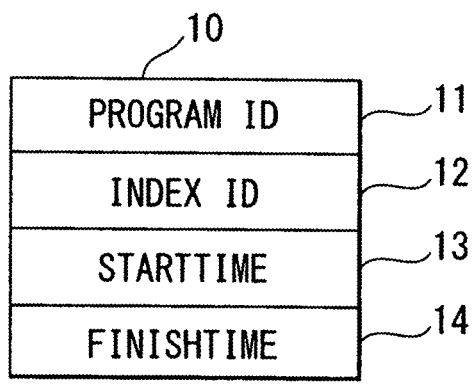
FIG. 5 is a diagram showing an example of items of index information according to Embodiment 1.

The metadata interpretation unit 103 receives an input of metadata such as the index information or the trigger information received by the broadcast reception unit 101 and, when the input is the index information, associates it with the corresponding program content accumulated on the HDD 105 based on its contents. The accumulated location of the index information can also be stored by the metadata interpretation unit 103. FIG. 5 is a diagram showing an example of a data listing of index information. As apparent from FIG. 5, index information 10 includes, as data displaying its contents, various data such as a program ID 11 for identifying a program (or content) corresponding to the index information 10, an index ID 12 for identifying the index information 10, "starttime" 13, and "finishtime" 14. The "starttime" 13 is data displaying starttime of the corresponding program. The "finishtime" 14 is data displaying finishtime of the corresponding program. The "finishtime" 14 may be "duration".

FIG. 6 is a diagram showing a description example of the index information 10. In the example of FIG. 6, the index information 10 describes display of "200301011700FUJI" as the "Content ID" 11 as a program ID and "001" as the index ID 12. For the specific contents of the index information 10 such as the "starttime" 13 and the "finishtime" 14, display of <starttime>200301011903 is described as the "starttime" 13, which indicates 19:03 dated Jan. 1, 2003. Display of <finishtime>200301011907 is described as the "finishtime" 14, which indicates 19:07 dated Jan. 1, 2003.

When the input is trigger information, the metadata interpretation unit 103 inquires of the mobile data terminal management unit 106 from its contents whether there is a mobile data terminal matched with set mode information. When the corresponding mobile data terminal exists, the index information 10 of the corresponding index ID 12 is searched from the HDD 105 to extract the partial program content associated with the corresponding index information 10 and is transmitted to the accumulated image processing unit 104 together with the mobile data terminal information.

Figure 7:
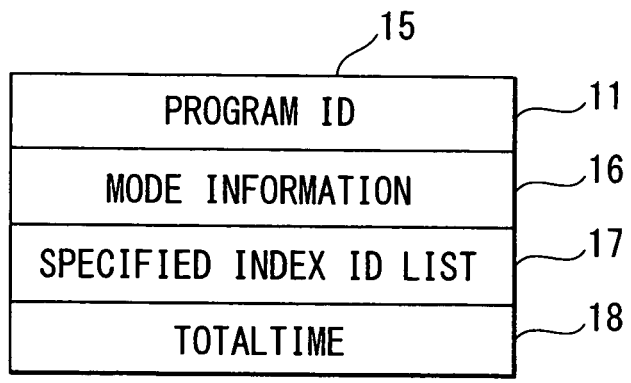
FIG. 7 is a diagram showing an example of items of trigger information according to Embodiment 1.

FIG. 7 is a diagram showing an example of a data listing of trigger information. As shown in FIG. 7, trigger information 15 includes the program ID 11 for identifying a program (or content) corresponding to the trigger information 15, mode information 16 for identifying the trigger information 15, a specified index ID 17 (which is substantially the same as the index ID 12) for identifying the specified index information 10, and "totaltime" 18 of the trigger information 15. The trigger information 15 may have the mode information 16 and the specified index ID 17 and remove "totaltime".

FIG. 8 is a diagram showing a description example of the trigger information 15. In the example of FIG. 8, the trigger information 15 describes display of "200301011700FUJI" as the program ID 11 and describes "replay" as the mode information 16. The specified index ID 17 describes "3" as the total number of the specified index information, describes No. 1 ID="001", No. 2 ID="011", and No. 3 ID="035" as IDs of the three pieces of specified index information, and describes specific contents of "00:05:00" as the "totaltime" 18.

Figure 3:
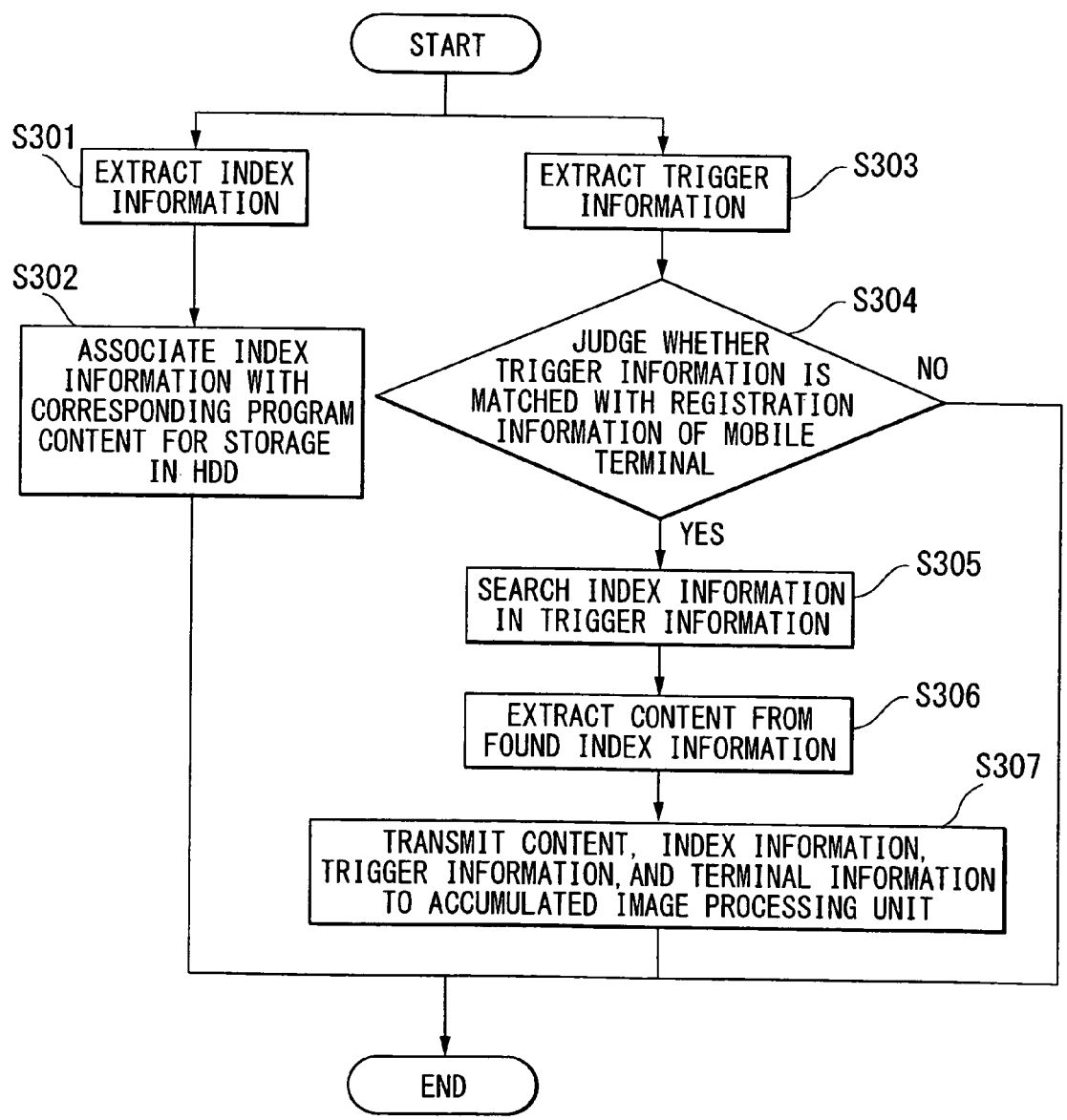
FIG. 3 is a processing flowchart of a metadata interpretation unit according to Embodiment 1.

The processing operation of the metadata interpretation unit 103 will be described using a processing flow shown in FIG. 3.

The metadata interpretation unit 103 receives an input from the broadcast reception unit 101 and, when the received information includes the index information 10, extracts the index information 10 (S301). The index information 10 is associated with the corresponding program content indicated by the index information 10 to be stored in the HDD 105 (S302) for ending the input reception operation.

When the received information includes the trigger information 15, the trigger information 15 is extracted (S303). Mode information in the trigger information 15 is detected to inquire of the mobile data terminal management unit 106 whether there is a mobile data terminal to which the corresponding mode is set and, when no corresponding mobile data terminals exist, the processing is ended (S304). When the corresponding mobile data terminal exists, the index information 10 is detected based on the specified index ID 17 in the trigger information 15 (S305). A program content is extracted based on the detected index information 10 together with the index information 10 detected from the HDD 105 (S306). The program content and the index information are directly transmitted from the HDD 105 to the accumulated image processing unit 104, and the trigger information 15 is transmitted to the accumulated image processing unit 104 (S307) to end a series of processing operations.

The accumulated image processing unit 104 which has received an input of a program content from the image processing unit 102 accumulates the program content on the HDD 105 for each program. The accumulated image processing unit 104 which has received inputs of the trigger information 15, the index information 10, and a partial program content associated with the index information 10 from the metadata interpretation unit, replaces the partial contents based on the contents of the trigger information 15 (FIGS. 7 and 8), and transmits the restructured program content to the mobile data terminal.

Figure 4:
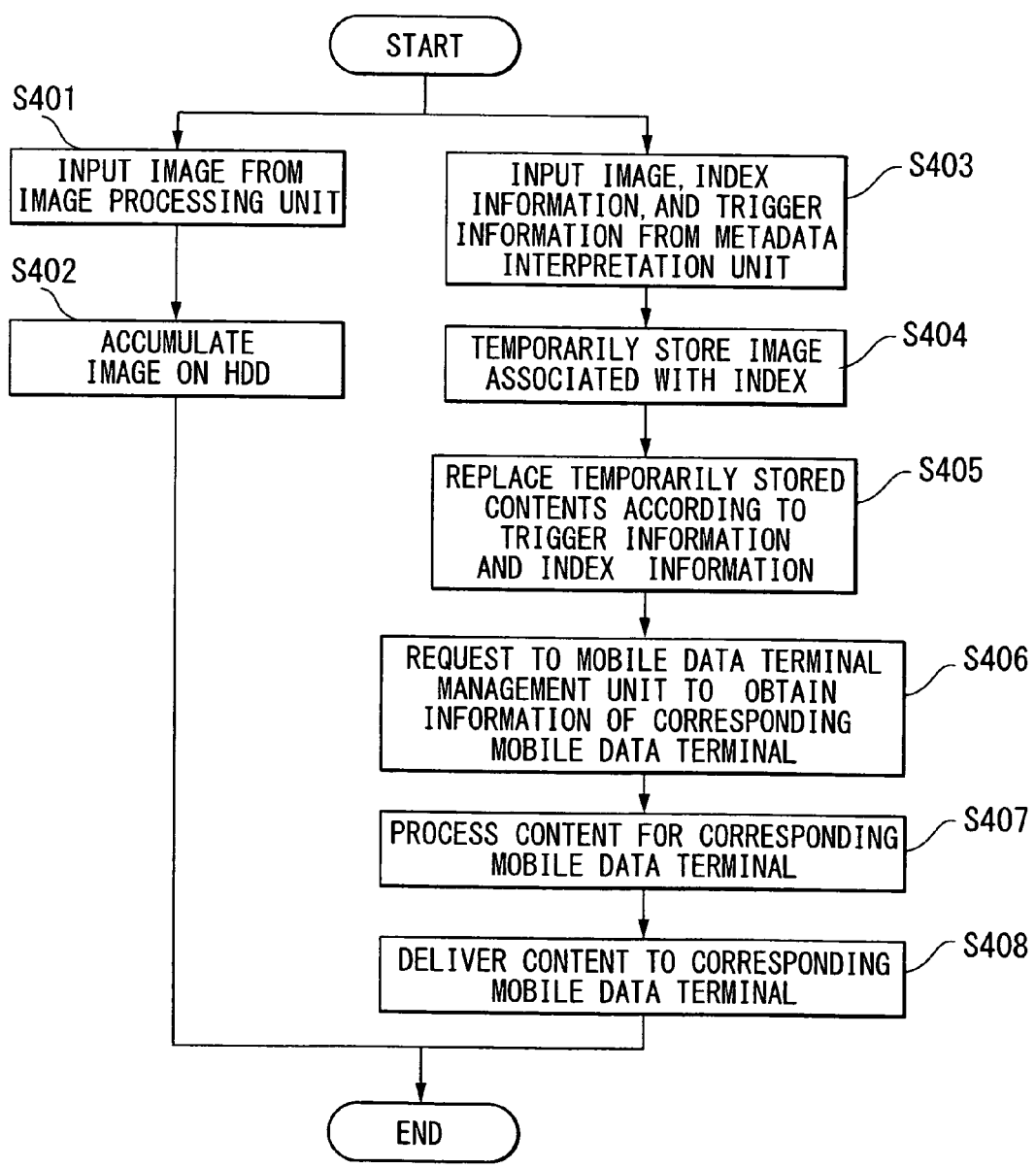
FIG. 4 is a processing flowchart of an accumulated image processing unit according to Embodiment 1.

The processing operation in the accumulated image processing unit 104 will be described using a processing flow shown in FIG. 4.

The accumulated image processing unit 104 analyzes a received input and, when an input signal is an input from the image processing unit 102, receives an input of a program content (S401). The program content is stored in the HDD 105 (S402) to end the input reception operation.

When the input signal is an input from the metadata interpretation unit 103, inputs of the index information 10 and the trigger information 15 are received (S403) A program content is associated with the index information 10 to be temporarily stored (S404). The index information 10 for the index order in the trigger information 15 is used to replace the program contents (S405). The mobile data terminal management unit 106 is requested to obtain the status of a mobile data terminal transmitting the replaced program content to obtain information of the mobile data terminal (S406). The program content is restructured according to the corresponding mobile data terminal (S407). Specifically, format conversion and file size change, that is, bit rate change are assumed. The restructured program content is transmitted to the corresponding mobile data terminal (S408) to end a series of accumulated image processing operations.

A program content is accumulated for each program by an instruction from the accumulated image processing unit 104. The program content is searched based on the index information 10 by an instruction from the metadata interpretation unit 103 so that the program content is associated with the index information 10 to be accumulated on the HDD 105. The accumulated image processing unit 104 searches the index information 10 based on the trigger information 15 and searches and outputs a program content associated with the index information 10.

The program content accumulation means (HDD 105) is not limited to an HDD and may be other storage media (e.g., an optical disk and DVD) having an accumulation area, and need not exist in the immobile display device 1 (or may be provided outside the immobile display device 1).

Figure 9:
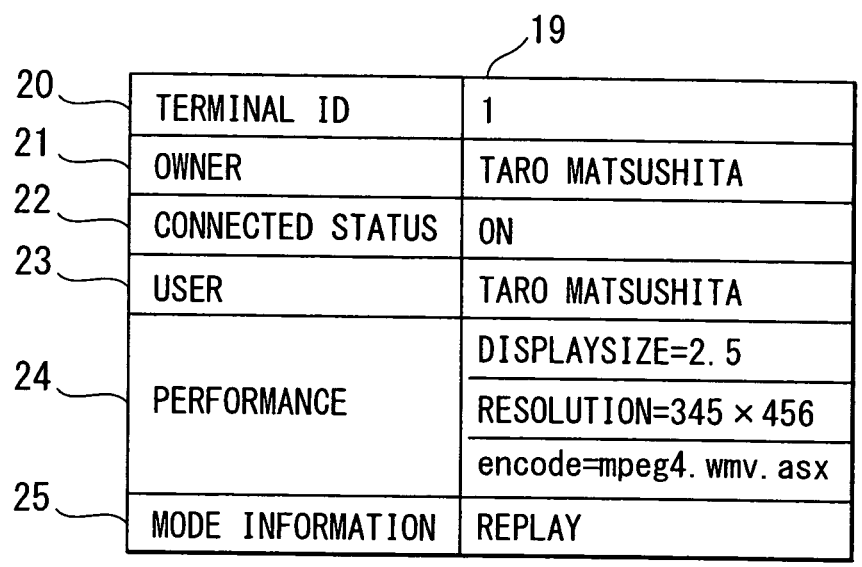
FIG. 9 is a diagram showing a data structure example of a mobile data terminal managed by a mobile data terminal management unit according to Embodiment 1.

The mobile data terminal management unit 106 receives a connection request from the mobile data terminal A, establishes connection, and stores and manages information (management information) of the mobile data terminal A. The mobile data terminal management unit 106 replies a mobile data terminal information inquiry request from the metadata interpretation unit 103 and inquiry requests of the ability of the mobile data terminal A and connection information from the accumulated image processing unit 104. FIG. 9 is a diagram showing an example of management information of the mobile data terminal A. As shown in FIG. 9, mobile data terminal management information 19 includes various information such as a terminal ID 20 of the mobile data terminal, an owner name 21, information 22 on whether the connected status is ON or OFF, a user name 23, performance (or function) 24 of the mobile data terminal, and mode information 25.

The display unit 107 receives and displays an input from a program content from the image processing unit 102. The display unit 107 need not be integral with the immobile display device 1 and is assumed to be a display unit in the center of a family or viewed by plural persons, which is not particularly limited.

The mobile data terminal A will be described using FIG. 1. The mobile data terminal A has a reception unit 108 receiving an input of a restructured program content from the accumulated image processing unit 104 of the immobile display device 1 and transmitting it to a display unit 109, the display unit 109 receiving and displaying the restructured program content from the reception unit 108, an identification unit 110 identifying an input from input means such as a touch panel to transmit it to an instruction unit 111, and the instruction unit 111 transmitting input information and connection information from the identification unit 110 and terminal information (FIG. 9) to the mobile data terminal management unit 106.

The operation of the thus configured interlocked display system will be described by taking a professional baseball relay broadcast as an example. The configuration example of the interlocked display system assumes the status in which two mobile data terminals A and B exist in the immobile display device 1, as shown in FIG. 2.

Plural viewers view a currently broadcasted program in real time on the immobile display device 1 and two of the viewers hold mobile data terminals, respectively. The viewer holding the mobile data terminal A views the professional baseball replay broadcast from the start of the program. The viewer holding the mobile data terminal B starts viewing the program of the professional baseball relay broadcast in the middle of it.

A connection request from the instruction unit 111 of the mobile data terminal A is transmitted to the mobile data terminal management unit 106 of the immobile display device 1 to establish connection for transmit terminal information. The identification unit 110 of the mobile data terminal A selects the replay mode. The instruction unit 111 transmits mode information as "replay". The mobile data terminal management unit 106 stores it.

The professional baseball relay broadcast is viewed on the immobile display device 1. The image processing unit 102 accumulates and transmits the currently viewed professional baseball relay broadcast to the accumulated image processing unit 104. The accumulated image processing unit 104 secures the stored location of the professional baseball relay broadcast in the HDD 105 to start storing it in the HDD 105. The index information 10 transmitted with the program content of the professional baseball relay broadcast at the same time is transmitted to the metadata interpretation unit 103 and is associated with the program content of the professional baseball relay broadcast in the HDD 105 to be stored.

After the batting order has gone through once or more, the trigger information 15 is transmitted with the program content and the index information 10 at the same time to the broadcast reception unit 101 according to the current program content. The transmitted trigger information 15 is interpreted by the metadata interpretation unit 103 to check that the trigger information 15 is from the currently viewed program for reading that mode information is the "replay" mode. The metadata interpretation unit 103 inquires of the mobile data terminal management unit 106 whether there is a mobile data terminal which has selected the same mode and identifies that the mobile data terminal A corresponds to it.

The metadata interpretation unit 103 searches the HDD 105 from the index ID specification information of the contents of metadata (index information and trigger information) (FIGS. 6 and 8). The metadata interpretation unit 103 extracts the index information 10 to take out a part of the professional baseball relay broadcast associated with the index information 10 and belonging to the trigger information 15 and the mobile data terminal A, thereby transmitting it to the accumulated image processing unit 104.

The accumulated image processing unit 104 receives an input from the metadata interpretation unit 103 and replaces the program contents (a part of the professional baseball relay broadcast) in the specified index ID order of the trigger information 15. In the example of the trigger information 15 of FIG. 8, the specified index IDs, No. 1 ID="001", No. 2 ID "011", and No. 3 ID "035" are replaced in that order. The accumulated image processing unit 104 inquires of the mobile data terminal management unit 106 about information of the corresponding mobile data terminal A and processes the stream according to the mobile data terminal. In the case of the mobile data terminal management information shown in FIG. 9, the stream is processed according to display size=2.5, resolution=345 456, and encode=mpeg 4. The accumulated image processing unit 104 transmits the stream to the mobile data terminal A according to terminal information. The mobile data terminal A receives the transmitted stream by the reception unit 108 to display it on the display unit 109. When a batter C is going to bat, the immobile display device 1 processes the today's previous batting image of the batter C. The user can view it on the mobile data terminal without any special operation.

The user holding the mobile data terminal B is assumed to view the program in the middle thereof. As in the mobile data terminal A, a connection request from the instruction unit 111 of the mobile data terminal B is transmitted to the mobile data terminal management unit 106 of the immobile display device 1 to establish connection for transmitting terminal information. The user of the mobile data terminal B views the program in the middle thereof and sets mode information to the "highlight" mode on the mobile data terminal management unit 106 to view the previous highlight. The trigger information 15 in the periodically transmitted "highlight" mode is transmitted to the broadcast reception unit 101 of the immobile display device 1. The metadata interpretation unit 103 inquires of the mobile data terminal management unit 106. The corresponding mobile data terminal (mobile data terminal B) exists. Since the corresponding mobile data terminal exists, the metadata interpretation unit 103 is operated as in the "replay" mode to extract the program content for transmitting it to the accumulated image processing unit 104. The accumulated image processing unit 104 is basically operated as in the "replay" mode.

As described above, reception of the trigger information is delivery timing. The specified partial program content included in the trigger information is extracted, restructured, and delivered to the mobile data terminal. The user uses real time broadcast on the sub-display device to view information interlocked with the current real time broadcast.

The user who views the program in the middle thereof can enjoy the previous highlight and can catch up with the current game status. The user who views the highlight on the mobile data terminal cannot trouble other users. Since mode change can be done in the middle of the program, the user of the mobile data terminal B who has viewed the highlight can change the mode to "replay" to enjoy the professional baseball relay broadcast.

The trigger arrival and its contents may be displayed on the screen of the display unit 107 of the immobile display device or the display unit 109 of the mobile data terminal to be shown to the user. With this as a trigger, the mode of the mobile data terminal may be changed.

(Embodiment 2)

The overall configuration of an interlocked display system according to Embodiment 2 of the present invention is the same as that of Embodiment 1 except that the broadcast reception unit 101 receives inputs of a program content, index information, trigger information, and program information (signal line d) including data of the program content.

The operation of the interlocked display system will be described by focusing on program information. The program information is transmitted from the broadcast reception unit 101 to the metadata interpretation unit 103. The metadata interpretation unit 103 inquires of the mobile data terminal management unit 106 whether there is a connected mobile data terminal, and interprets the program information when there is the corresponding connected mobile data terminal, thereby processing it for display. The processed program information is transmitted to the accumulated image processing unit 104. The accumulated image processing unit 104 inquires of the mobile data terminal management unit 106, obtains information of the connected mobile data terminal, and processes it according to the mobile data terminal. The accumulated image processing unit 104 checks based on the trigger information that the program content is not currently transmitted to the mobile data terminal and transmits the processed program information to the mobile data terminal. When the program content is transmitted to the mobile data terminal, the program content and the program information are further processed and transmitted to be displayed on a part of the screen.

Program information 36 describes detailed information and location of program data, as shown in FIG. 25, and has the program ID 11 identifying a program content, a service ID (channel) 37 identifying a provider or a broadcasting station performing service, starttime 38, time (duration) 39 indicating the length of time, a program content title 40, a keyword 41 indicating the contents of a program content, performers 42, a program content category 43, the number of episodes in a series 44, viewing restriction 45 in which no viewers under eighteen are allowed, an interlocked viewing service 46 indicating whether or not the program corresponds to the interlocked viewing service by the main display device and the sub-display device disclosed by the present invention, and mode listing information 16 showing a listing of mode information corresponding to the program.

The program information 36 refers to SI information currently used for digital broadcasting and Program Information defined by server broadcasting, which is not particularly limited.

Figure 15:
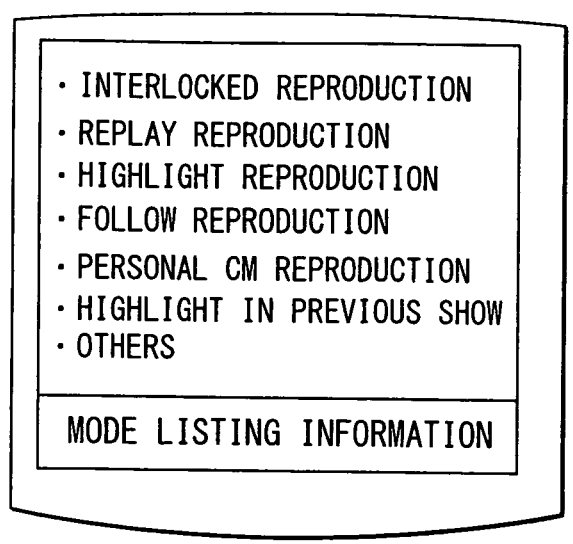
FIG. 15 is a diagram showing a mode listing showing example on the mobile data terminal.

The mode listing information 16 given to program information is transmitted as in the program information when connection with the mobile data terminal is established. Available mode information is given to and selected by the user. The user can select mode information corresponding to the program and view a partial program content corresponding to the program extracted based on the trigger information of the corresponding mode information. Mode information different for each program exists. The user selects the mode information for each program. The trigger information having the corresponding mode information is received to allow viewing of the partial program content on the mobile data terminal. FIG. 15 is a diagram showing a mode listing information showing example on the mobile data terminal. As apparent from FIG. 15, the operation mode includes interlocked reproduction, replay reproduction, highlight reproduction, follow reproduction, personal CM reproduction, previous highlight, and other modes. The operation mode can be freely set depending on a viewed program and is not limited.

Mode information given to program information is delivered as in EPG (Electronic Program Guide) to be accumulated on the immobile display device. The mode information can be delivered as one program guide to the mobile data terminal when connection with the mobile data terminal is established before the start of the program and can be set to be recorded in advance. The mode information as one program guide can be set to be recorded in advance on the immobile display device before the start of the program.

As described above, the user can enjoy program information when a selected mode image is transmitted. A program producer can set mode information for each program and provide a mode image matched with a delivered program. The user can perform viewing matched with the program.

(Embodiment 3)

Figure 10:
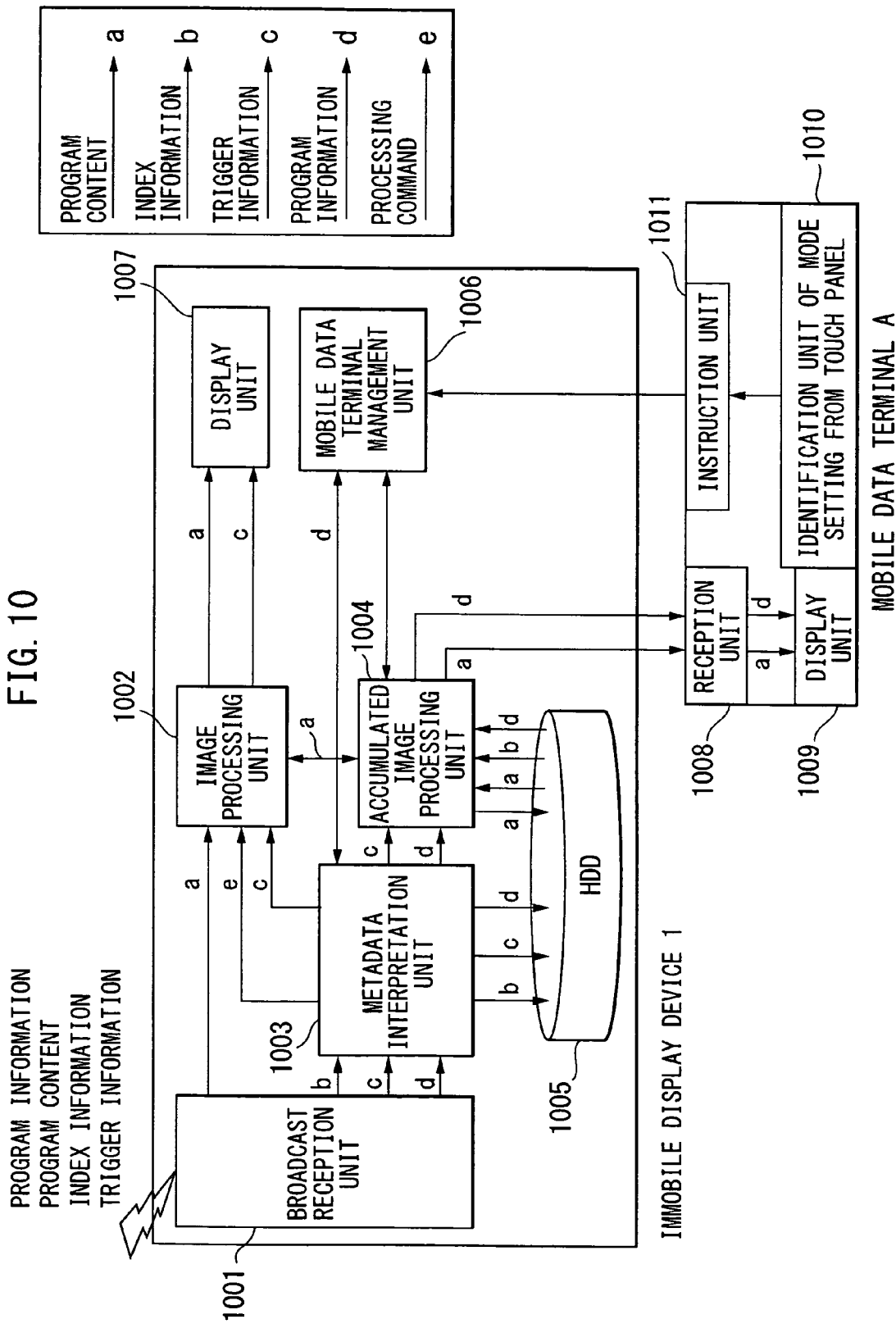
FIG. 10 is a block diagram showing the overall configuration of an interlocked display system according to Embodiment 3 of the present invention.

FIG. 10 is a block diagram showing the overall configuration of an interlocked display system according to Embodiment 3 of the present invention. The configuration of an interlocked display system according to Embodiment 3 of the present invention is basically the same as that of Embodiment 1 except that as shown in FIG. 10, a processing instruction from a metadata interpretation unit 1003 to an image processing unit 1002 is transmitted (signal line e).

In Embodiment 3 of the present invention, accumulation instruction information, accumulated program information, and transmission time are added to trigger information. In addition to viewing a program content, related content related to the currently viewed program content is inputted to be clearly accumulated.

Here, the operation will be described by focusing on trigger information and a related content. By way of example, a serial drama is being viewed. As in Embodiments 1 and 2, the drama is viewed on the immobile display device 1. Trigger information is transmitted upon starting viewing the drama. The metadata interpretation unit 1003 checks that an accumulation instruction flag is on and transmission starttime of the accumulated program information and transmits the trigger information to the image processing unit 1002.

Figure 11:
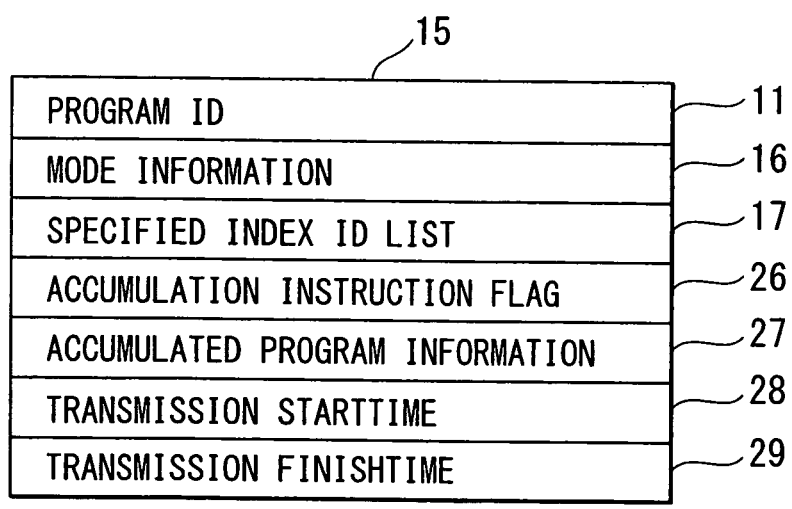
FIG. 11 is a diagram showing an example of items of trigger information according to Embodiment 3.

FIG. 11 is a diagram showing an example of a data listing of trigger information used in Embodiment 3. FIG. 12 is a diagram showing a description example of trigger information used in Embodiment 3. The contents of FIGS. 11 and 12 are basically the same as the contents of the above-described trigger information related to FIGS. 7 and 8. FIGS. 11 and 12 include more data structure information than that of FIGS. 7 and 8. As apparent from FIG. 11, trigger information includes data displaying the program ID 11 for identifying a program (or content) corresponding to the trigger information, the mode information 16 for identifying the trigger information, the specified index ID 17 for identifying specified index information, an accumulation instruction flag 26 instructing accumulation of the program content, accumulated program information 27 indicating information on the accumulated program, transmission starttime 28 starting transmission of the program, and transmission finishtime 29 finishing transmission of the program.

In the example of FIG. 12 as a diagram showing a description example of the trigger information, the trigger information 15 describes display of "200301011700FUJI" as the program ID 11 and "accumulation" as the mode information 16. The specified index ID 17 describes No. 1 ID="999" as the ID of specified index information. "00:05:00" is described as "totaltime". For the accumulated information, the accumulation instruction flag 26 describes "ON". The accumulated program information 27 has an accumulated information ID of "ex001" and describes the contents of "the highlight of the tenth episode". The transmission starttime 28 describes "200301011700". The transmission finishtime 29 describes "200301011708".

The trigger information for accumulation instruction is repeatedly transmitted until the transmission starttime. The image processing unit 1002 stores the accumulated program ID and transmission time as accumulation set in advance based on the received trigger information. On the transmission starttime, the image processing unit 1002 identifies the related content to transmit it to an accumulated image processing unit 1004. The accumulated image processing unit 1004 accumulates the inputted related content to an HDD 1005. In this example, the related content is the previous highlight and is transmitted when an opening theme is being played. Another trigger information is displayed on the immobile display device 1 and is transmitted. The transmitted trigger information reads from the HDD 1005 the related content which has been just accumulated to be inputted with it to the accumulated image processing unit 1004. The accumulated image processing unit 1004 inquires of the mobile data terminal management unit 1006 about a connected mobile data terminal and processes and transmits the related content for the mobile data terminal. As in Embodiment 2, "related content" may be added to mode information for mode selection, accumulation and transmission and, as in the above embodiment, the mobile data terminal may be checked with the mode information. The related content the user has checked may be accumulated and transmitted.

As described above, the user can view the previous highlight with the same opening theme. The user can also view other related contents during CM in the similar form.

(Embodiment 4)

Figure 13:
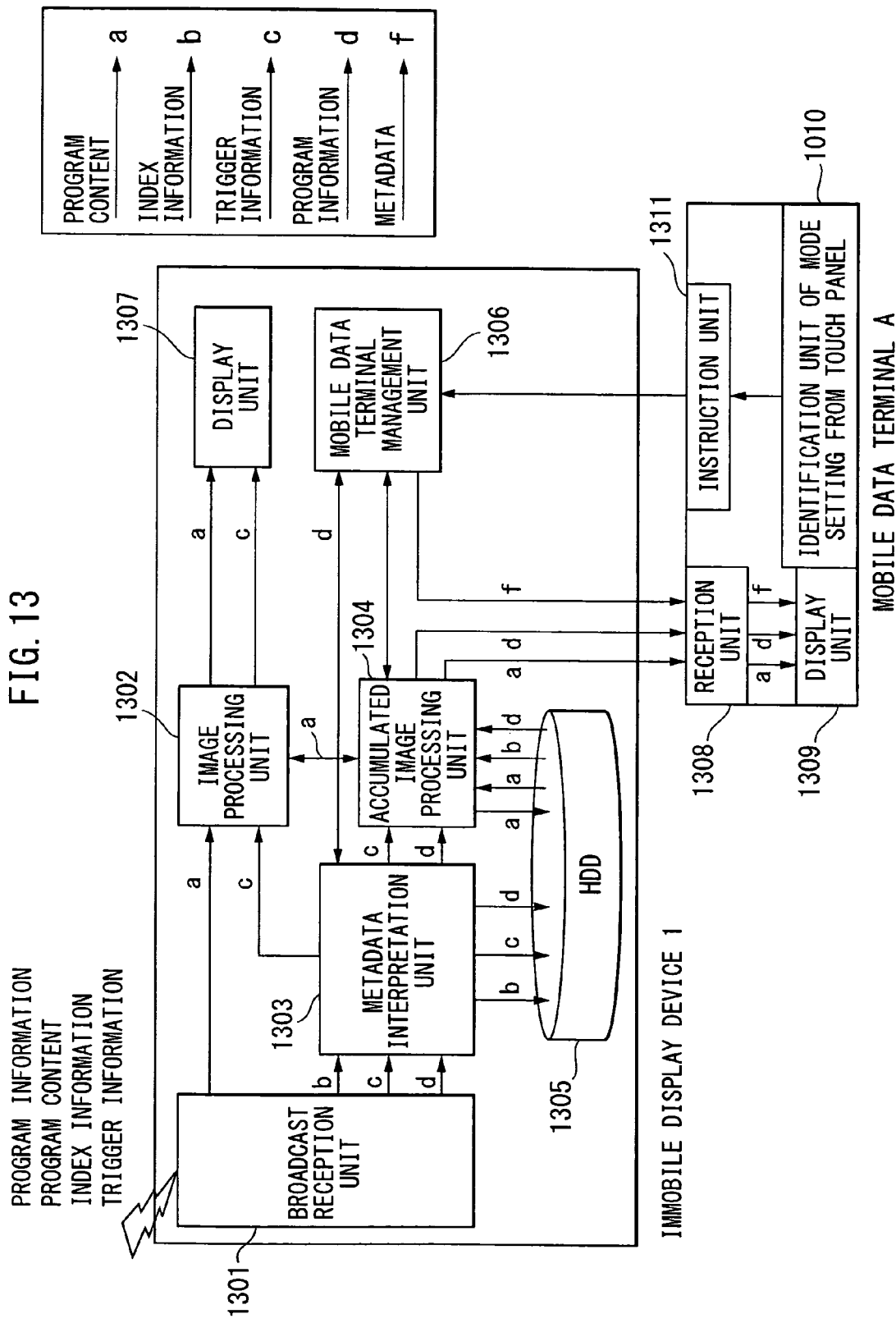
FIG. 13 is a block diagram showing the overall configuration of an interlocked display system according to Embodiment 4 of the present invention.

FIG. 13 is a block diagram showing the overall configuration of an interlocked display system according to Embodiment 4 of the present invention. The configuration of an interlocked display system according to Embodiment 4 of the present invention is basically the same as that of Embodiments 1 to 3 except that as shown in FIG. 13, metadata (signal line f) is transmitted from a mobile data terminal management unit 1306 of the immobile display device 1 to a reception unit 1308 of the mobile data terminal. Metadata transmission from the mobile data terminal realizes a video operation menu on the mobile data terminal. A specific operation will be described.

As in Embodiment 2 of the present invention, information (management information) of the mobile data terminal is obtained by the mobile data terminal management unit 1306 at connection request from the mobile data terminal. FIG. 14 is a diagram showing a listing of management information of a mobile data terminal. As apparent from FIG. 14, the mobile data terminal management information 19 includes various information such as the terminal ID 20 of the mobile data terminal, the owner name 21, the information 22 on whether the connected status is ON or OFF, the user name 23, the performance (or function) 24 of the mobile data terminal, the mode information 25, and operation information 30 and 31. When the mobile data terminal management unit 1306 obtains the information (management information) of the mobile data terminal, it transmits metadata for the video operation menu corresponding to the mobile data terminal for default display. Specifically, the GUI environment such as a media player is provided to the lower part of the display of a touch panel device. The selection menu form is displayed on the lower part of the display of a cross key device. The metadata is embedded so that a command having an argument is transmitted to the mobile data terminal when the display of the metadata is selected. The prepared commands are assumed to be reproduce, stop, temporary stop, fast-forward, and rewind, which is not particularly limited.

Figure 16:
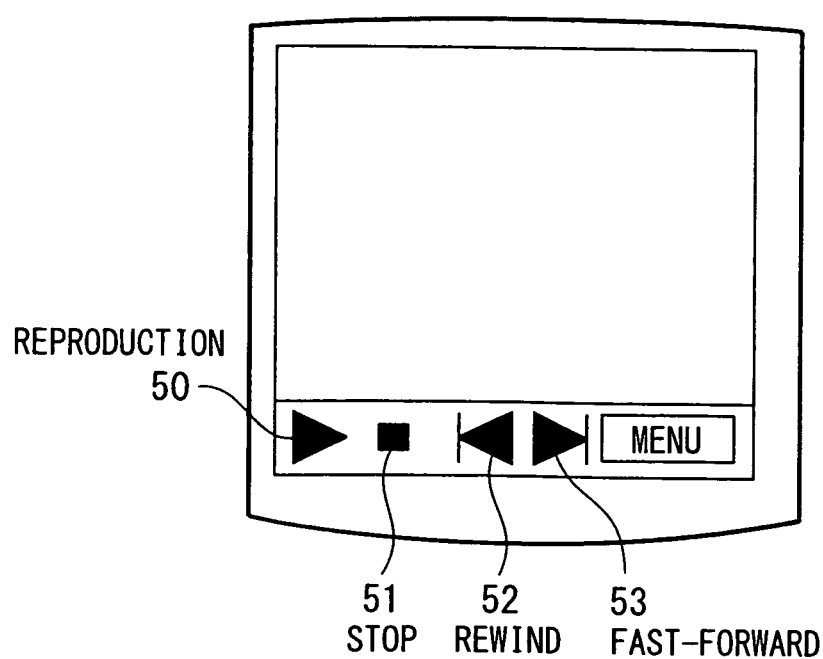
FIG. 16 is a diagram showing a trick play showing example on the mobile data terminal.
Figure 17:
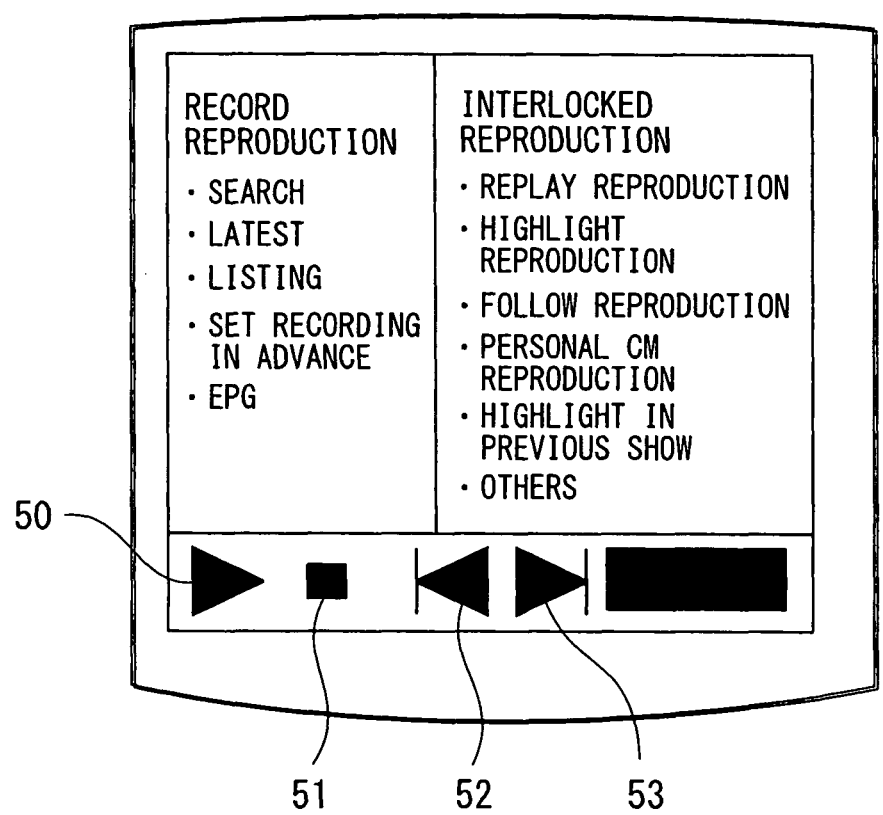
FIG. 17 is a diagram showing a menu showing example on the mobile data terminal.

As described above, FIG. 15 is a diagram showing a mode listing showing example on the mobile data terminal and displays mode information operable by interlocked reproduction and replay reproduction. FIG. 16 is a diagram showing a trick play showing example on the mobile data terminal and illustrates the selection menu of reproduce 50, stop 51, fast-forward 53, and rewind 52. FIG. 17 is a diagram showing a menu showing example on the mobile data terminal. By way of example, the stop 50 is selected in the state that an image is displayed on the mobile data terminal in the highlight mode. When the stop 50 is selected, an identification unit 1310 of the mobile data terminal interprets metadata. The device ID 20 is added through an instruction unit 1311. The STOP command and the device ID are transmitted to the mobile data terminal management unit 1306 of the immobile display device 1. The mobile data terminal management unit 1306 identifies the command and the device ID 20 to instruct an accumulated image processing unit 1304 to stop transmission. The accumulated image processing unit 1304 stops transmission to delete the stream to be transmitted due to the STOP command.

As another example, the rewind 52 is selected in the state that an image is displayed on the mobile data terminal in the replay mode. When the rewind 52 is selected, the identification unit 1310 of the mobile data terminal interprets metadata. The device ID 20 is added through the instruction unit 1311. The REW command, rewind time, and the device ID are transmitted to the mobile data terminal management unit 1306 of the immobile display device 1. The mobile data terminal management unit 1306 identifies the command and the device ID 20 to instruct the accumulated image processing unit 1304 to stop transmission and restructure image content. The accumulated image processing unit 1304 extracts the image content again from the command and the rewind time to perform restructuring for transmission. The trigger information and index information are stored until the completion of delivery. It can respond to a further video menu. The user can use the video menu regardless of a delivery method such as streaming.

(Embodiment 5)

The overall configuration of an interlocked display system according to Embodiment 5 of the present invention is the same as that of Embodiment 1 except that the contents of index information and trigger information inputted to the broadcast reception unit 101 in Embodiment 5 of the present invention are more than that of Embodiment 1.

Figures 19, 20:
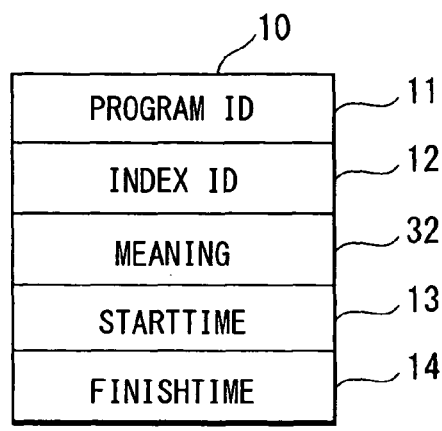
FIG. 19 is a diagram showing an example of items of index information according to Embodiment 5.
FIG. 20 is a diagram showing a description example of index information according to Embodiment 5.
Figure 21:
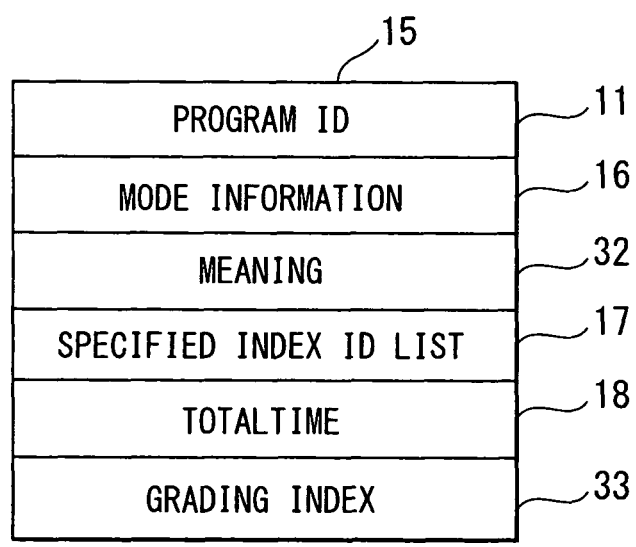
FIG. 21 is a diagram showing an example of items of trigger information according to Embodiment 5.

In this embodiment, the operation of the interlocked display system will be described by focusing on generation of a program content displayed on the mobile data terminal. The index information is added to the contents of data (FIGS. 5 and 6) of Embodiment 1 to incorporate meaning information 32 (FIGS. 19 and 20). The "meaning information" describes the contents specified by an index at the keyword level. The meaning information 32 may be hierarchized. The trigger information is added to the contents of data (FIGS. 7 and 8) of Embodiment 1 to add the meaning information 32 and grading index information 33 (FIGS. 21 and 22).

The index information inputted to the broadcast reception unit 101 is associated with a program content to be accumulated to the HDD 105 by the metadata interpretation unit 103, as in Embodiment 1. The trigger information inputted to the broadcast reception unit 101 is judged by the metadata interpretation unit 103 using information from the mobile data terminal management unit 106, as in Embodiment 1, to extract the program content to transmit the program content, the index information, and the trigger information to the accumulated image processing unit 104.

Figure 18:
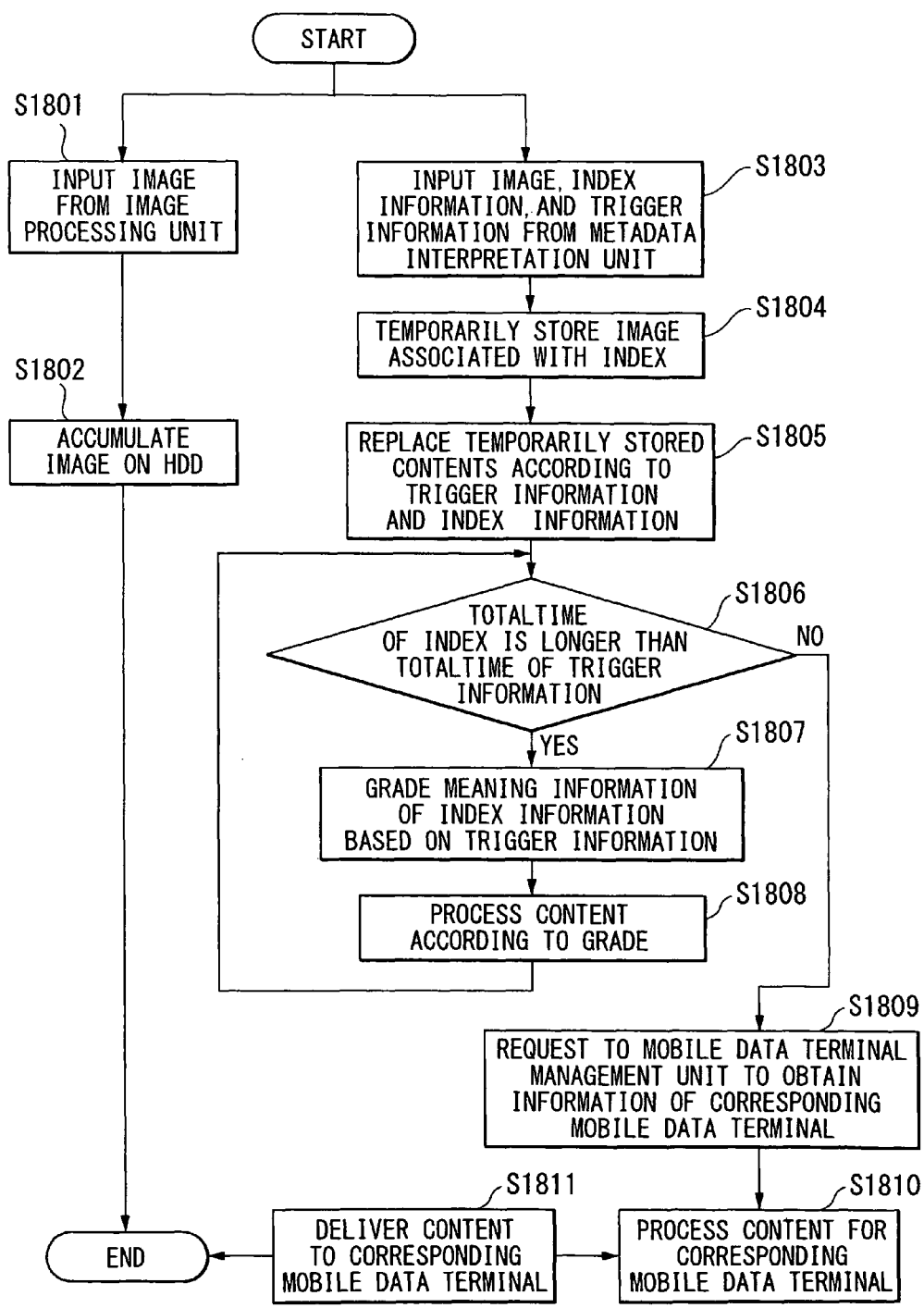
FIG. 18 is a processing flowchart of an accumulated image processing unit according to Embodiment 5 of the present invention.

The accumulated image processing operation of the accumulated image processing unit 104 will be described using the flowchart of FIG. 18.

A received input is analyzed and, when an input signal is an input from the image processing unit 102, an input of a program content is received (S1801). The program content is stored in the HDD 105 (S1802) to end the input reception processing.

When the input signal is an input from the metadata interpretation unit 103, inputs of index information and trigger information are received (S1803). The program content is associated with the index information to be temporarily stored (S1804).

The program content is replaced using the specified index ID 17 in the trigger information 15 (S1805). The starttime 13 and the finishtime 14 of the extracted index information 10 are used to calculate time of all program contents for comparing it with the totaltime 18 of the trigger information 15 (S1806). When the totaltime from the index information is longer than the totaltime 18 of the trigger information 15, the routine is advanced to S1807. When it is shorter, the routine is advanced to S1809.

When the routine is advanced to S1807, the meaning information 32 in the index information 10 is graded using the grading index 33 of the trigger information 15 (S1807) The grading index 33 of the trigger information 15 indexes weight of the meaning information according to a degree of importance of the program content and grades the meaning information 32 so that as the meaning information 32 is more important, a larger numerical value is given thereto. The program contents in order of ascending index grade are sequentially deleted (S1808). Time of the remaining all program contents is calculated for each deletion to compare it with the totaltime 18 of the trigger information 15. S1806 to S1808 are repeated until the totaltime 18 of the trigger information 15 is longer than that. When the totaltime 18 of the trigger information 15 is longer, the routine is advanced to S1809.

When the routine is advanced to S1809, the mobile data terminal management unit 106 is requested to obtain the status of the mobile data terminal to be transmitted to obtain information of the mobile data terminal (S1809) The program content is restructured according to the corresponding mobile data terminal (S1810). Specifically, format conversion and file size change, that is, bit rate change are assumed.

The restructured program content is transmitted to the corresponding mobile data terminal (S1811) to end a series of accumulated image processing operations.

Any one piece of information of the meaning information 32 of the trigger information 15, the mode information 16, and the meaning information 32 of the index information 10 may be used to generate superimpose information to display it on the program content transmitted to the mobile data terminal. The superimpose information is one of special effects of video edit and refers to information for displaying characters and a different cut-out image (generated by the meaning information) on a screen displaying the content. Mode information and the meaning information of trigger information are always shown as character information on the upper left side of the screen during reproduction of the program content. The meaning information of the index information is displayed with the mode information according to the displayed index information, which is not particularly limited.

(Embodiment 6)

The overall configuration of an interlocked display system according to Embodiment 6 of the present invention is the same as that of Embodiment 1. As shown in FIG. 2, as an embodiment, a method in which the immobile display device 1 is a home server and the mobile data terminal is used at a place other than the user's home will be described.

The immobile display device 1 accumulates all broadcasted programs or, as in Embodiment 2, previously accumulates mode information given to program information to set to record a viewed program in advance from the mobile data terminal. That is, the immobile display device 1 is set in advance so as to accumulate the program the user views on the mobile data terminal. The immobile display device 1 accumulates a program content, index information, trigger information, and program information from the start of the program. The mobile data terminal establishes connection with the immobile display device 1 before starting broadcasting the corresponding program or while broadcasting it, receives program information given mode information, and registers the corresponding mode information to the immobile display device 1. The user registers the corresponding mode information to view a point scene such as a highlight scene or a replay scene corresponding to the mode information such as a notable scene of the corresponding program on the mobile data terminal at a place other than the user's home.

Figure 23:
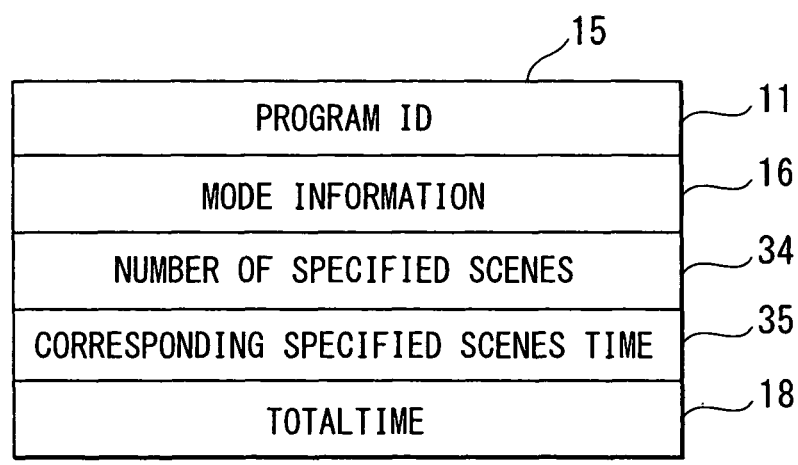
FIG. 23 is a diagram showing an example of items of trigger information according to Embodiment 6.

The trigger information is compared with the trigger information of FIGS. 7 and 8 to describe the number of specified scenes 34 and corresponding specified scene time 35, as shown in FIGS. 23 and 24. The corresponding specified time 35 specifies starttime and duration of the corresponding partial program content. The starttime is time from the start of the program.

In Embodiment 1, when the partial program content extracted by the trigger information 15 is specified, the specified index ID 17 is specified. The corresponding index information 10 specifies the part of the program content. The index information 10 is essential. The number of specified scenes and the corresponding specified scene time, not the specified index ID 17, are specified based on the trigger information 15. The corresponding partial program content can be extracted based on the trigger information 15 without the index information 10. The program content is accumulated as it is at real time broadcast reception. The program content is directly extracted based on the trigger information at reception of the trigger information to be transmitted to the mobile data terminal.

The present invention is described above based on the preferred embodiments shown in the drawings. It is apparent that those skilled in the art can easily change and modify this invention. Such changed parts are included in the scope of the invention.

The interlocked display device according to the present invention is useful in a broadcasted program service in the state that index information and trigger information are given to a broadcasted program and that the user owns a display for personal use. As the display for personal use, a mobile data terminal, a cellular phone, and a PDA can be used and can transmit a program to a remote place using communication.

What is claimed is:

1. An accumulation display device comprising:
a reception unit that receives a currently broadcasted program content, index information associating a currently broadcasted program content with an index and specifying a scene of the program and trigger information including mode information for special reproduction of the program content and constituting metadata with the index information;
an accumulation unit that accumulates the program content, the index information and the trigger information;
a main display unit receiving and displaying the input of the program content received by the reception unit;
a metadata interpretation unit that interprets the index information and the trigger information of the currently broadcasted or the accumulated program content and outputs mode information for special reproduction;
an accumulated image processing unit connected with a mobile data terminal functioning as a sub reception and display unit, and extracting at least a part of the accumulated program content based on the mode information from the trigger information, restructures the program content extracted based on the mode information, and outputs the restructured program content to the mobile data terminal; and
a mobile data terminal management unit managing information of the mobile data terminal to which the restructured program content should be outputted;
the index information includes a program ID for identifying a program corresponding to the index information, an ID for identifying the index information, starttime data of the corresponding program, and finishtime data of the corresponding program;
the mobile data terminal management unit manages information of the mobile data terminal and further, generates a metadata for a video operation menu including various operation commands for performing reproduction, replay reproduction, stop and so on corresponding to the mobile data terminal and transmits it to the mobile data terminal, and then realizes a video operation menu on the mobile data terminal;
the accumulated image processing unit outputs, when the mobile data terminal management unit receives an operation command according to the metadata for the video operation menu from the mobile data terminal, the restructured program content to the mobile data terminal or stops the outputting operation according to the operation command; and
the accumulated image processing unit, in the restructuring and outputting operation, further extracts at least a part of the program content from the index information based on contents of the trigger information, restructures the program content extracted based on the mode information, outputs the restructured program content to the mobile data terminal, and displays the restructured program content video operated on the mobile data terminal in a manner that the currently broadcasted original program content received by the reception unit is displayed in parallel on the main display unit.

2. The accumulation display device according to claim 1, wherein the trigger information includes mode information for performing special reproduction of at least any one of interlocked reproduction, replay reproduction, highlight reproduction, and follow reproduction of a currently viewed program content.

3. The accumulation display device according to claim 2, further comprising a display unit that displays the currently broadcasted or the accumulated program content and the mode information for special reproduction.

4. The accumulation display device according to claim 1, wherein the accumulated image processing unit extracts, according to a request of mode information for special reproduction from a sub-display device receiving a restructured program content, at least a part of the accumulated program content based on trigger information received after the request or the latest trigger information of the request, and outputs the restructured program content.

5. The accumulation display device according to claim 1, further comprising a sub-display device management unit that manages terminal information including a terminal ID and performance of at least one mobile data terminal receiving a restructured program content,
wherein the accumulated image processing unit processes and outputs a program content according to performance of each sub-display device.

6. The accumulation display device according to claim 1, wherein the index information further includes meaning information describing contents of a program content specified by an index at a keyword level.

7. The accumulation display device according to claim 1, wherein the trigger information includes one or more of a program ID for identifying a program corresponding to the trigger information, mode information for identifying the trigger information, starttime specifying an extracted scene, and extraction time, thereby specifying timing transmitting at least a part of the program content to the mobile data terminal.

8. The accumulation display device according to claim 1, wherein the trigger information includes a program ID for identifying a program corresponding to the trigger information, mode information for identifying the trigger information, and a specified index ID for identifying specified index information, thereby specifying timing transmitting at least a part of the program content to the mobile data terminal.

9. The accumulation display device according to claim 8, wherein the trigger information further includes meaning information describing a program content associated with index information at a keyword level, and grading index information of weight of the meaning information according to a degree of importance of the program content.

10. The accumulation display device according to claim 9, wherein the trigger information includes accumulation instruction information instructing accumulation of the corresponding program content.

11. The accumulation display device according to claim 1, wherein the accumulated image processing unit adds, to the restructured program content, superimpose information displayed as an image separate from the program content, and changes and restructures time of each partial program content at restructuring the partial program content based on meaning information included in the trigger information and the index information.

12. The accumulation display device according to claim 11, wherein the superimpose information is generated using any of meaning information of trigger information, a trigger name, and meaning information of index information.

13. An interlocked display method using an accumulation display device reproducing a currently broadcasted program content and a mobile data terminal interlocking with the accumulation display device to perform special reproduction of the program content,
the accumulation display device comprising the steps of:
receiving the currently broadcasted program content, index information associating a currently broadcasted program content with an index and specifying a scene of the program and trigger information including mode information for special reproduction of the program content and constituting metadata with the index information;
accumulating the program content, the index information and the trigger information;
displaying the received program content;
extracting at least a part of the accumulated program content associated with the index information based on mode information from the trigger information, restructuring the program content extracted based on the mode information, and outputting the restructured program content to the mobile data terminal,
managing information of the mobile data terminal, generating a metadata for a video operation menu including various operation commands for performing reproduction, replay reproduction, stop and so on corresponding to the mobile data terminal, and transmits it to the mobile data terminal,
receiving an operation command according to the metadata for the video operation menu from the mobile data terminal, and outputting the restructured program content to the mobile data terminal or stopping the output operation according to the operation command,
wherein, in the step of outputting the restructured program content to the mobile data terminal, extracting at least a part of the program content from the index information based on contents of the trigger information, restructuring the program content extracted based on the mode information, and outputting the restructured program content to the mobile data terminal,
the data terminal comprising the steps of:
displaying the metadata for the video operation menu received from the accumulation display device on a sub display unit of the data terminal,
transmitting an operation command for performing video operation of reproduction, replay reproduction, stop and so on at the data terminal according to the metadata for the video operation menu to the accumulation display device,
receiving the program content restructured from the accumulation display device; and
displaying the received and restructured program content on the sub display unit of the data terminal in a manner that the currently broadcasted original program content received by the accumulation display is displayed in parallel on a main display unit of the accumulation display device.

* * * * *